(12) United States Patent
Kajiwara et al.

(10) Patent No.: US 10,556,459 B2
(45) Date of Patent: Feb. 11, 2020

(54) WRITING INSTRUMENT FOR FORMING THERMOCHROMIC HANDWRITING

(71) Applicant: KABUSHIKI KAISHA PILOT CORPORATION, Tokyo-to (JP)

(72) Inventors: Takumi Kajiwara, Kanagawa-ken (JP); Naoto Masushige, Kanagawa-ken (JP)

(73) Assignee: KABUSHIKI KAISHA PILOT CORPORATION (ALSO TRADING AS PILOT CORPORATION), Tokyo-To (JP)

( * ) Notice: Subject to any disclaimer, the term of this patent is extended or adjusted under 35 U.S.C. 154(b) by 0 days.

(21) Appl. No.: 16/065,934

(22) PCT Filed: Dec. 22, 2016

(86) PCT No.: PCT/JP2016/088439
§ 371 (c)(1),
(2) Date: Jun. 25, 2018

(87) PCT Pub. No.: WO2017/115725
PCT Pub. Date: Jul. 6, 2017

(65) Prior Publication Data
US 2019/0047318 A1 Feb. 14, 2019

(30) Foreign Application Priority Data
Dec. 29, 2015 (JP) .................. 2015-257569

(51) Int. Cl.
*B43K 7/03* (2006.01)
*B43K 1/08* (2006.01)
(Continued)

(52) U.S. Cl.
CPC .................. *B43K 7/03* (2013.01); *B43K 1/08* (2013.01); *B43K 7/10* (2013.01); *B43K 7/12* (2013.01); *C09D 11/17* (2013.01); *C09D 11/18* (2013.01)

(58) Field of Classification Search
CPC .......... C09D 11/18; C09D 11/17; B43K 7/12; B43K 7/10; B43K 1/08; B43K 7/03
See application file for complete search history.

(56) References Cited

U.S. PATENT DOCUMENTS 3,415,603 A * 12/1968 Blanchard ................ B43K 7/12
401/101
4,421,560 A * 12/1983 Kito ...................... B41M 5/305
106/31.2
(Continued)

FOREIGN PATENT DOCUMENTS

EP 1 308 313 5/2003
EP 1 820 662 8/2007
(Continued)

OTHER PUBLICATIONS

International Preliminary Report on Patentability and Written Opinion of the International Searching Authority dated Jul. 12, 2018 in International (PCT) Application No. PCT/JP2016/088439.
(Continued)

*Primary Examiner* — Patrick M. Buechner
(74) *Attorney, Agent, or Firm* — Wenderoth, Lind & Ponack, L.L.P.

(57) ABSTRACT

A writing instrument excellent in handwriting density and temporal stability. The writing instrument includes a ball-point pen tip attached to the front end portion of the ink storage cylinder; and a ball-point pen refill having an ink composition for a writing instrument loaded therein. The ink composition for the writing instrument is a thermochromic ink containing at least a thermochromic microcapsule pig-
(Continued)

ment. The writing instrument includes a pressurization mechanism for applying a pressure to the back end of the ink composition for the writing instrument.

10 Claims, 4 Drawing Sheets

(51) Int. Cl.
*B43K 7/12* (2006.01)
*B43K 7/10* (2006.01)
*C09D 11/18* (2006.01)
*C09D 11/17* (2014.01)

(56) References Cited

U.S. PATENT DOCUMENTS

| | | | | |
|---|---|---|---|---|
| 5,785,746 | A * | 7/1998 | Kito | C09D 11/18 106/31.86 |
| 6,082,920 | A | 7/2000 | Furukawa | |
| 8,430,591 | B1 * | 4/2013 | Okamoto | B43K 7/02 401/215 |
| 9,777,178 | B2 * | 10/2017 | Clayton | C09D 11/50 |
| 2006/0112851 | A1 * | 6/2006 | Ono | B41M 5/305 106/31.16 |
| 2007/0189836 | A1 * | 8/2007 | Senga | B43K 1/086 401/195 |
| 2008/0292385 | A1 * | 11/2008 | Wase | B43K 1/086 401/195 |
| 2010/0098475 | A1 * | 4/2010 | Fujita | B43K 1/086 401/1 |
| 2010/0098476 | A1 * | 4/2010 | Imamura | B43K 1/086 401/1 |
| 2011/0008095 | A1 * | 1/2011 | Fujita | C09D 11/17 401/198 |
| 2012/0308290 | A1 * | 12/2012 | Ito | B43K 7/02 401/104 |
| 2012/0328356 | A1 * | 12/2012 | Ishii | B43K 1/084 401/216 |
| 2014/0147190 | A1 * | 5/2014 | Takayama | B43K 1/084 401/216 |
| 2016/0017163 | A1 * | 1/2016 | Clayton | C09D 11/50 106/31.64 |

FOREIGN PATENT DOCUMENTS

| | | |
|---|---|---|
| EP | 2 030 804 | 3/2009 |
| JP | 2002-19372 | 1/2002 |
| JP | 3820426 | 9/2006 |
| JP | 2008-50484 | 3/2008 |
| JP | 2011-153321 | 8/2011 |
| JP | 4793960 | 10/2011 |
| JP | 2013-10249 | 1/2013 |
| JP | 2014-8629 | 1/2014 |
| JP | 2015-164787 | 9/2015 |
| JP | 2016-221906 | 12/2016 |

OTHER PUBLICATIONS

International Search Report dated Mar. 21, 2017, in International (PCT) Application No. PCT/JP2016/088439.
Extended European Search Report dated Jul. 1, 2019 in corresponding European Patent Application No. 16881700.5.
Office Action dated May 17, 2019 in Chinese Patent Application No. 201680076752.3 with English translation.
Machine Translation of JP 2014-040488 which corresponds to JP 2015-164787 with a publication date of Sep. 2015.
Machine Translation of JP 2012-145204 which corresponds to JP 2014-008629 with a publication date of Jan. 2014.
Abstract of JP 2000-201806 which corresponds to JP 2002-019372 with a publication date of Jan. 2002.

* cited by examiner 7-1

7-2

WRITING INSTRUMENT FOR FORMING THERMOCHROMIC HANDWRITING

TECHNICAL FIELD

The present invention relates to a writing instrument for forming a thermochromic handwriting, the writing instrument comprising: an ink storage cylinder; and a ball-point pen refill including a ball-point pen tip attached to the front end portion of the ink storage cylinder, wherein the writing instrument having a pressurization mechanism that applies pressure from the rear end side of the ink storage cylinder to an ink composition for a writing instrument loaded therein.

BACKGROUND ART

Conventionally, a ball-point pen refill comprising an ink storage cylinder having a thermochromic ink loaded therein is well known, for example, a writing instrument containing a thermochromic ink is disclosed in Japanese Unexamined Patent Application Publication No. 2011-153321 "Reversible thermal color changing aqueous ink composition and writing instrument using the same".

The handwriting formed using a ball-point pen refill, which comprises an ink storage cylinder having such a thermochromic ink loaded therein, can be decolored by heating. Consequently, as has been widely recognized the ball-point pen refill is used for a writing instrument for taking notes and making marks as a substitute for pencils and mechanical pencils.

Typically, in a writing instrument, in order to improve the visibility of handwriting, the handwriting density is also preferably enhanced. Moreover, it is believed that, when copying papers having written notes etc. thereon, using e.g., a monochrome copy machine, the handwriting density is preferably enhanced in order to bring about a sufficient copying density.

CITATION LIST

Patent Literature

Patent Literature 1 Japanese Unexamined Patent Publication No. 2011-153321

SUMMARY OF THE INVENTION

Technical Problem

Unfortunately, in a thermochromic ink containing a microcapsule pigment, a coloring material being encapsulated in a microcapsule, a high handwriting density tends to be difficult to be achieved; as compared with other writing instruments in which a coloring material is not enclosed in a microcapsule. In order to enhance the handwriting density, it is recommended, e.g., to increase the content of a microcapsule pigment, to increase the particle size, or to increase the content of a coloring material in a microcapsule. However, when allowing the content of a microcapsule pigment and the content of a coloring material in a microcapsule to be excessively booted, the temporal stability and thermochromism might be deteriorated. For a black thermochromic ink, inter alia, particularly demanded has been a remedy of the above-said problems.

It is also suggested that, increasing the ink consumption per unit area, and thereby enhancing the handwriting density. Unfortunately, conventionally known methods for increasing the ink consumption per unit area as follows: e.g., a method for lowering the ink viscosity had a tendency to cause troubles such as separation of microcapsules over time; further, a method for increasing the vertical clearance of a ball, has been posed a problem of ink leakage from the front end of a ball-point pen tip, or air intrusion into a ball-point pen tip.

The object of the present invention is to achieve a writing instrument capable of forming a handwriting with a high handwriting density without increasing the content of a reversible thermochromic microcapsule pigment in the ink composition for a writing instrument or the content of a coloring material in a microcapsule; to achieve a writing instrument excellent in handwriting density and temporal stability. Also, the object of the present invention is to achieve a writing instrument having a higher ink consumption per unit area without accompanying ink leakage from the front end of a ball-point pen tip or air intrusion into a ball-point pen tip.

Solution to Problem

To achieve the above-mentioned objective, a writing instrument according to the present invention is characterized by comprising: an ink storage cylinder having an ink composition for a writing instrument comprising a reversible thermochromic microcapsule pigment loaded therein; and a ball-point pen refill including a ball-point pen tip attached to the front end portion of the ink storage cylinder; wherein the writing instrument further having a pressurization mechanism that applies pressure from the rear end side of the ink storage cylinder to the ink composition for a writing instrument. It is to be noted that, in the present invention "front" refers to a pen tip side, and "rear" refers to the opposite side thereof.

Also, the handwriting density formed by a writing instrument according to the present invention is preferably 0.7 to 1.5 during pressurization by a pressurization mechanism.

Moreover, the ink consumption per 10 m achieved by said pressurization mechanism is preferably 1.3 times or more that during non-pressurization.

Also, the ink viscosity of an ink composition for a writing instrument is preferably 600 mPa·s to 2000 mPa·s, at 20° C. and at a shear rate of 3.84 sec$^{-1}$; and 10 mPa·s to 100 mPa·s at a shear rate of 384 sec$^{-1}$.

Additionally, the pressure applied to an ink composition for a writing instrument is preferably 1 time or more and 1.5 times or less the atmospheric pressure.

Moreover, the handwriting density when a pressurization mechanism is in operation is preferably 1.2 times or more as compared with that when a pressurization mechanism is not in operation.

Furthermore, the ink consumption value per unit area is preferably 0.7 to 1.5 mg/cm$^2$.

Also, a ball-point pen tip comprises a tip main body having a ball holding chamber thereon, and a ball having a diameter of 0.5 mm or less; wherein an ink circulation hole is formed at the center of the bottom wall of the ball holding chamber, a plurality of ink circulation grooves radially extending from the ink circulation hole are formed; on the bottom wall of the ball holding chamber, a ball seat having a generally circular arc surface shape is provided; the ball is placed on the ball seat, so that a part of the ball can protrude from a tip front end edge to rotatably be held; the vertical clearance of the ball being preferably 15 to 40 μm.

Preferably, it also further includes a barrel. Moreover, it is preferable that a ball-point pen refill is movably disposed on the back side of the barrel, and urged toward the front end side of the barrel by the resilient member disposed within the barrel; and that with the front end portion of the ball-point pen tip protruding from the front end of the barrel a pressurization mechanism moves the ball-point pen refill backwards, presses a rear end portion of the ink storage cylinder against the sealing portion provided inside the barrel to form an enclosed space; and compresses the enclosed space to apply pressure to the ink composition for a writing instrument.

It is to be noted that, the handwriting width and the handwriting density in the present invention are ISO13660-compliant measurements of the handwriting obtained by writing; the handwriting width (mm) is a region of 60% or less of the reflectance; and the handwriting density is a mean value within the range of reflectance of 75% or less. Specifically, with respect to the handwriting width and the handwriting density in the claimed invention, by using a personal image quality evaluation device (from QEA (Quality Engineering Associates), PIASII), the handwriting width and the handwriting density were measured for 15 places of handwriting, and the average values were adopted.

Also, the ink consumption per 10 m in the present invention is determined by calculation, after writing down 10-m notes, and the ink remaining amount was measured in conformity with JIS standard S6054 (20° C., writing angle: 70 degrees writing speed: 4 m/min, self-revolution, writing load: 100 gf, underlay stainless steel plate). It is also determined by the average value by conducting such tests a total of five times.

Moreover, the pressure applied to an ink composition for a writing instrument can be measured by measuring the volume variation of before-pressurization and after-pressurization compression spaces. At this time, assuming 20° C., and the atmospheric pressure of 1000 hPa, calculation is made.

Advantageous Effects of Invention

The present invention is a writing instrument characterized by comprising an ink storage cylinder having an ink composition for a writing instrument comprising a reversible thermochromic microcapsule pigment loaded therein; and a ball-point pen refill including a ball-point pen tip attached to the front end portion of the ink storage cylinder, wherein the writing instrument further having a pressurization mechanism that applies pressure from the rear end side of the ink storage cylinder loaded therein to the ink composition for a writing instrument.

According to the present invention, without increasing the content of a microcapsule pigment or the content of a coloring material in a microcapsule, a handwriting with an enhanced handwriting density can be formed. In addition, according to the present invention, a writing instrument wherein the ink consumption per unit area can be increased without accompanying ink leakage from the front end of a ball-point pen tip or air intrusion into a ball-point pen tip, can be achieved.

DESCRIPTION OF EMBODIMENTS (Writing Instruments)

Figure 1:
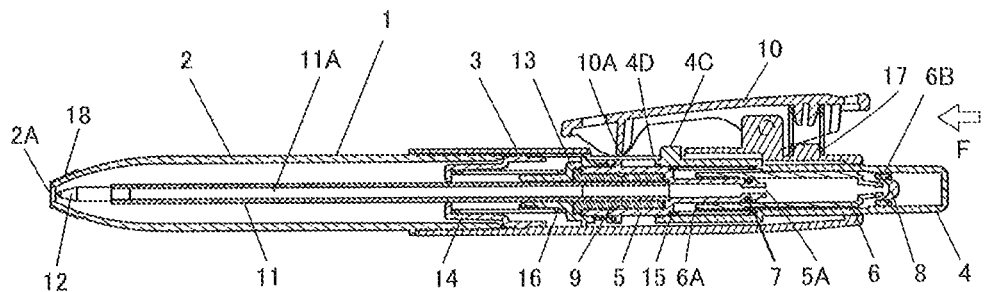
FIG. 1 is a longitudinal-sectional view of the writing instrument of Example 1, showing a ball-point pen tip in an immersed state (in an un-pressurized state).
Figure 2:
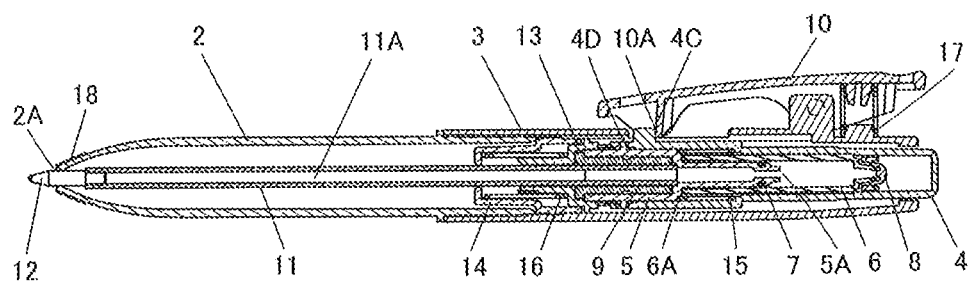
FIG. 2 is a longitudinal-sectional view of the writing instrument of Example 1, showing a ball-point pen tip in a projecting state (in a pressurized state).
Figure 3:
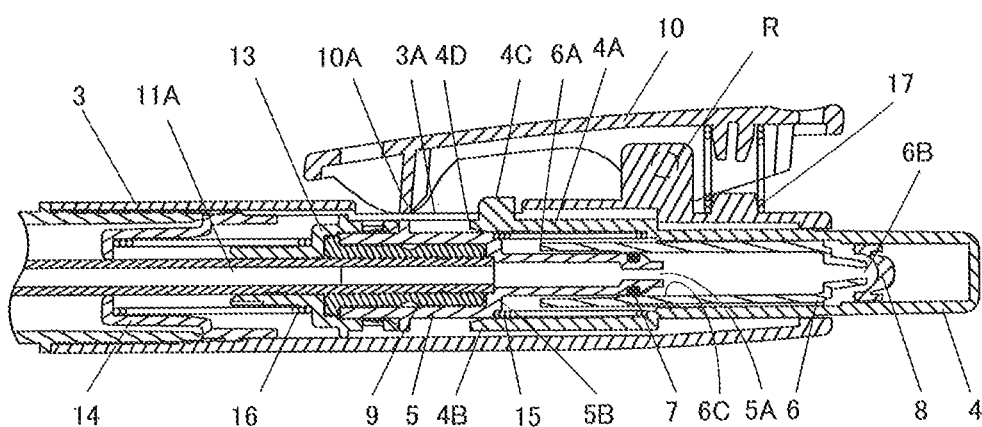
FIG. 3 is an enlarged longitudinal sectional view of FIG. 1, a part of which being omitted.
Figure 4:
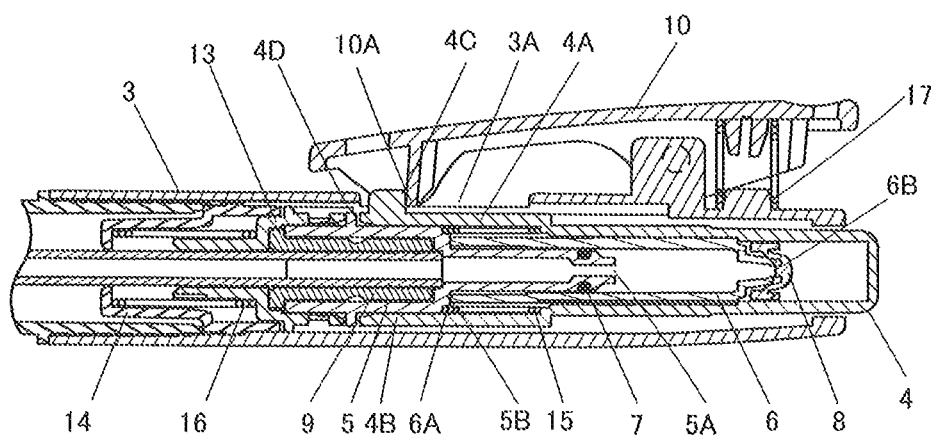
FIG. 4 is an enlarged longitudinal sectional view of FIG. 2, a part of which being omitted.

In one embodiment, a writing instrument according to the present invention is a writing instrument comprising: an ink storage cylinder having an ink composition for a writing instrument comprising a reversible thermochromic microcapsule pigment (hereinafter, sometimes simply referred to as an ink composition) loaded therein; and a ball-point pen refill including a ball-point pen tip attached to the front end of the ink storage cylinder.

In addition, the writing instrument further has a pressurization mechanism that applies pressure from the rear end side of the ink storage cylinder to the ink composition loaded therein. It should be noted that, a writing instrument according to the present invention is characterized in that the ink composition contained therein comprises a reversible thermochromic microcapsule pigment, so that the handwriting formed has a thermochromic property, and will be discolored or decolorized by heating or cooling. Therefore, a writing instrument according to the present invention is a writing instrument for forming a thermochromic handwriting, hereinafter, sometimes simply referred to as a writing instrument.

A writing instrument of the present invention, by having the above-mentioned configuration, without increasing the content of a reversible thermochromic microcapsule pigment in an ink composition, or without increasing the content of a coloring material in a microcapsule, a handwriting with an enhanced handwriting density can be formed. Also, without accompanying ink leakage from the front end portion of the ball-point pen tip or air intrusion into a ball-point pen tip, the ink consumption per unit area can be increased.

In one embodiment, a writing instrument of the present invention can further include a barrel. This barrel may accommodate a ball-point pen refill. Alternatively, without including a barrel, a ball-point pen refill itself may constitute the main body of a writing instrument. An ink storage cylinder and barrel are also preferably transparent, colored transparent, or translucent in order that the ink color, remaining quantity of the ink and the like can be visually confirmed.

(Pressurization Mechanisms)

The pressure applied from the rear end side of the ink storage cylinder to an ink composition loaded therein by a pressurization mechanism, is preferably equal to or greater than the atmospheric pressure; specifically 1 time or more and 1.5 times or less the atmospheric pressure. More specifically, the atmospheric pressure, when assuming 1000 hPa, is preferably more than 1000 hPa and 1500 hPa or less; and more preferably more than 1000 hPa and 1200 hPa or less. In this way, while suppressing ink leakage from the front end portion of the tip, the ink consumption can be made suitable, thereby allowing the handwriting quality and the handwriting density to be improved.

In a writing instrument according to in the present invention, the pressurization mechanism included in a writing instrument applies pressure to an ink composition from the rear end side of the ink storage cylinder. In one embodiment, a pressurization mechanism, by introducing a compressed gas such as an argon gas and by pumping, compresses the air present on the rear end side of an ink composition, and utilizes the pressure generated by the compressed air. Consequently, when the ink composition is consumed by writing, the volume of the compressed gas or air increases, thereby resulting in a gradual decrease in pressure, which may preclude a good handwriting from being maintained.

Therefore, it is preferable to keep the handwriting density after pressurization being high enough to allow improvement of the handwriting density by pressurization to be visible. Specifically, the handwriting density after pressurization, i.e., when a pressurization mechanism is in operation, is preferably 1.2 times or more; more preferably 1.5 to 5.0 times; and even more preferably 1.5 to 4.0 times as compared with that when a pressurization mechanism is not in operation. It should be noted that, in the present invention, the handwriting density is measured in conformity with ISO13660.

Although it is not limited thereto, a pressurizing mechanism in one embodiment will now be described. The ball-point pen refill provided in the writing instrument in the present embodiment is movably disposed on the rear side of a barrel, and urged toward the front end side of the barrel by the resilient member disposed within the barrel. With the front end portion of the ball-point pen tip protruding from the front end of the barrel, by applying a writing pressure by writing etc, to move the ball-point pen refill backward, the rear end portion of the ink storage cylinder is pressed against a sealing portion provided in the barrel, and thereby forming an enclosed space. Further, by moving the ball-point pen refill backwards, this enclosed space is compressed, and pressure is applied to the ink composition loaded into the ink storage cylinder provided in the ball-point pen refill from the rear end side of the ink storage cylinder.

When adopting such a pressurization mechanism in a state of not writing (where no writing pressure is applied), an un-pressurized state is induced, wherein no pressure is applied to the rear end of the ink composition; thus ensuring to prevent ink leakage from the front end of the tip. Further, since pressurization is reset for each stroke, the pressurizing force at the time of writing is stabilized, thereby exhibiting the effect that a density change hardly occurs.

It should be noted that, other embodiments of the pressurizing mechanism and the details thereof will be described in detail in the examples described later.

(Ball-Point Pen Refills)

A ball-point pen refill provided in a writing instrument according to the present invention comprises: an ink storage cylinder having an ink composition loaded therein; and a ball-point pen tip attached to the front end portion of the ink storage cylinder.

The handwriting density formed by a writing instrument according to the present invention is preferably 0.7 or more and 1.5 or less in a pressurized state, i.e., during pressurization by a pressurization mechanism. The handwriting density in a pressurized state, when assumed to be within the range of numerical values described above, becomes the same concentration as the handwriting density formed by using a general (non-thermochromic) writing instrument (1.0 or more and 1.2 or less or so) or the concentration of letters printed using a printer (1.5 or so); and when other writing instruments and a writing instrument according to the present invention are used in combination, the differences in the handwriting density can be reduced.

To enable writing even in the state where pressurization is not applied favorably by any chance, the handwriting density in an un-pressurized state can be preferably 0.2 or more; and more preferably 0.3 or more. At this time, the upper limit of the handwriting density can be, for example, less than 0.7, or 0.6 or less, but not necessarily limited thereto.

Secondly, the ink consumption per 10 m achieved when pressurized by a pressurizing mechanism of a writing instrument according to the present invention, is preferably 1.3 times or more that during non-pressurization. This can boost the handwriting density, while allowing the handwriting width to be widened. And further, making it possible to suppress ink leakage from the front end of a ball-point pen tip, thereby enabling to achieve a writing instrument satisfying the differences in density before and after pressurizations.

Further, when considering the writing performance on a paper surface (shading or blurring of a handwriting), the temporal stability, the ink consumption per 10 m achieved when pressurized by a pressurizing mechanism is preferably 1.5 times to 5.0 times; and more preferably 1.5 to 4.0 times that during non-pressurization. It is to be noted that, a pressurized state represents a state wherein the pressurizing mechanism is operated, and wherein from the start of writing until 10-m writing is completed with the pressurized state maintained. While an un-pressurized state represents a state having a pressure equal to the atmospheric pressure, wherein no pressure is applied to the rear end of an ink composition.

The ink consumption value per unit area of a writing instrument during the operation of a pressurization mechanism of the present invention is preferably 0.7 to 1.5 mg/cm$^2$; and more preferably 0.7 to 1.2 mg/cm$^2$. Whereby, a handwriting having the above-mentioned good handwriting density can be achieved.

It is to be noted that, in order to achieve a good handwriting, it is preferable to make the handwriting width smaller than the ball diameter; the handwriting width in a pressurized state is preferably 65% to 95%, and more preferably 70% to 90% of the ball diameter.

(Ink Storage Cylinders)

For an ink storage cylinder, for example, a molded body consisting of thermoplastic resins such as polyethylene, polypropylene, polyethylene terephthalate or the like, or a molded article consisting of a metal material is used. Among these, in terms of low evaporation and productivity of an ink, polypropylene is preferably used. Also, in order to maintain a pressurized state, a material having a gas barrier property such as an ethylene-vinyl alcohol copolymer (EVOH) is preferably used. An ink storage cylinder may also consist of a single layer or may consist of multiple layers.

(Ink Compositions for a Writing Instrument)

In the present invention, the ink composition loaded into the ink storage cylinder may be oily or aqueous. An ink composition having shear thinning properties may also be used.

The ink viscosity of an ink composition is 600 mPa·s to 2000 mPa·s at 20° C. and at a shear rate of 3.84 $sec^{-1}$; and preferably 10 mPa·s to 100 mPa·s at a shear rate of 384 $sec^{-1}$. By having such an ink viscosity, a suitable ink consumption amount as described above can be easily achieved, and ink leakage from the front end portion of a tip in a pressurized state can be suppressed.

The ink viscosity is preferably 1000 to 1500 mPa·s at 20° C. and at a shear rate of 3.84 $sec^{-1}$; and more preferably 30 mPa·s to 80 mPa·s at a shear rate of 384 $sec^{-1}$.

As shown in Example 2 described later, an ink composition may also be an embodiment in which a pressurizing mechanism remains to be inoperative even in a pen-point projection state.

An increase in ink runoff and the improvement of a handwriting density are more effectively enabled by pressurization, thus preferably an ink composition is aqueous; and inter alia an aqueous ink composition having shear thinning properties is preferable.

Further, an ink composition is preferably a reversible thermochromic ink comprising a reversible thermochromic microcapsule pigment.

Various types of reversible thermochromic inks can be used alone or in combination, including a heat-achromatizing type which decolorizes upon heating from a colored state; a color preserving type that stores and holds a color developing state or a decoloring state interchangeably within a specific temperature range; or a heat-color developing type which develops color by heating from a decolored state and returns to a decolored state by cooling from a color developing state, for example.

Furthermore, a reversible thermochromic ink may comprise a reversible thermochromic microcapsule pigment having a reversible thermochromic composition encapsulated therein, wherein the reversible thermochromic composition contains at least essential three components which have been conventionally known: (A) an electron-donating color former organic compound; (B) an electron-accepting compound; and (C) a reaction medium for determining the occurrence temperature of both coloring reactions, Microencapsulations of a reversible thermochromic composition include interfacial polymerization method, interfacial polycondensation method, in-situ polymerization method, liquid-cure coating method, phase separation method from an aqueous solution, phase separation method from an organic solvent, melt-dispersion cooling method, air-suspension coating method, spray-drying method and the like, which are selected depending on the application as appropriate.

Film materials for a microcapsule wall include epoxy resins, urea resins, urethane resins, isocyanate resins and the like.

Further, onto the surface of a microcapsule, a secondary resin coating may be provided depending on the purpose, so as to impart durability; or can also modify the surface characteristics thereof to put into practical use.

The average particle diameter of a microcapsule pigment is preferably 0.1 μm to 5.0 μm; more preferably 0.1 μm to 4.0 μm; and even more preferably 0.5 μm to 3.0 μm.

By assuming the average particle diameter of a microcapsule pigment being within the range of the numerical values described above, it is possible to make the writing sensation of the writing instrument of the present invention smoother while maintaining a high concentration of chromogenic. It is to be noted that, measurement of the particle size and the particle size distribution can be carried out by Coulter method (electrical detection band method), for example. Specifically, using a precise distribution measurement device (Multisizer 4e from Beckman Coulter) to carry out measurements; and based on the numerical value of the measurements, the average particle diameter (median diameter) is determined on a volumetric basis. Alternatively, a laser diffraction/scattering particle size distribution measuring apparatus [LA-300; from Horiba, Ltd.] is used to make a measurement, based on the numerical value calibrated using a standard sample, the average particle diameter (median diameter) can be determined on a volumetric basis.

Also, the mass ratio of a reversible thermochromic composition to a microcapsule wall membrane is preferably a reversible thermochromic composition to a wall membrane of 7:1 to 1:1; and more preferably 6:1 to 1:1. By assuming the ratio of a reversible thermochromic composition to a wall to be within the range of the numerical values described above, it is possible to improve the color density and clearness at the time of coloring, while maintaining the resistance to pressure and heat.

The content of a reversible thermochromic microcapsule pigment is preferably 5 to 40 mass %; more preferably 10 to 40 mass %; and even more preferably 15 to 35 mass % relative to the total amount of the ink composition. By assuming the content of a reversible thermochromic microcapsule pigment to be within the range of the numerical values described above, it is possible to improve the color developing performance while maintaining the ink outflow property. Also, in the present invention, without excessively increasing the content of a microcapsule pigment, the handwriting density can be enhanced so as to achieve an excellent temporal stability.

The discoloration temperature of a reversible thermochromic ink of the present invention is set properly depending on its purpose and the like. For example, when a reversible thermochromic ink which decolorizes by heating is used, the temperature at which it decolors by heating is preferably set 25° C. to 95° C.; and more preferably 36° C. to 90° C.

More specifically, a high-temperature side discoloration point [complete decoloration temperature (t4)] can be set within the range of 25° C. to 95° C., and preferably within the range of 36° C. to 90° C.; while the low-temperature side discoloration point [perfect color-developing temperature (t1)] can be set within the range of −30° C. to +20° C., and preferably within the range of −30° C. to +10° C. By having such a configuration, not only colors can be effectively maintained in a normal state (within a daily life temperature range), but also the handwriting can be easily discolored by heating, for example, heating with a frictional heat caused by a friction part or the like.

An ink composition used for the present invention may comprise a coloring agent other than the above-mentioned reversible thermochromic microcapsule pigment. As such a coloring agent, any of the dyes and pigments soluble or dispersible in an aqueous medium can be used, and specific examples thereof are illustrated below.

As a dye, acidic dyes, basic dyes, direct dyes and the like can be used. As an acid dye, New Coccine (C.I. 16255), Tartrazine (C.I. 19140), Acid Blue Black 10B (C.I. 20470), Guinea Green (C.I. 42085), Brilliant Blue FCF (C.I. 42090), Acid Violet 6B (C.I. 42640), Soluble Blue (C.I. 42755), Naphthalene Green (C.I. 44025), Eosin (C.I. 45380), Phloxine (C.I. 45410), Erythrosine (C.I. 45430), Nigrosine (C.I. 50420), Acid Flavine (C.I. 56205) and the like can be used.

As a basic dye, Chrysoidine (C.I. 11270), Methyl Violet FN (C.I. 42535), Crystal Violet (C.I. 42555), Malachite Green (C.I. 42000), Victoria Blue FB (C.I. 44045), Rhodamine B (C.I. 45170), Acridine Orange NS (C.I. 46005), Methylene Blue B (C.I. 52015) and the like can be used. As a direct dye, Congo Red (C.I. 22120), Direct Sky Blue 5B (C.I. 24400), Violet BB (C.I. 27905), Direct Deep Black EX (C.I. 30235), Kaya Las black G Conch (C.I. 35225), Direct Fast Black G (C.I. 35255), Phthalocyanine Blue (C.I. 74180) and the like can be used.

As pigments, fine water-dispersed pigment products and fluorescent pigments etc, which are stably dispersed in an aqueous medium using not only carbon black, Inorganic pigments such as ultramarine, and organic pigments such as copper phthalocyanine blue, benzidine yellow and the like, but also using surfactants and resins in advance, can be used.

For example, C.I. Pigment Blue 15: 3B [Item name: Sandye Super Blue GLL, pigment content 24%, from Sanyo Color Works, LTD.], C.I. Pigment Red 146 [Item name: Sandye Super Pink FBL, pigment content 21.5%, from Sanyo Color Works, LTD.], C.I. Pigment Yellow 81 [Item name: TC Yellow FG, pigment content about 30%; from Dainichiseika Color & Chemicals Mfg. Co., Ltd.], C.I. Pigment Red 220/166 [Item name: TC Red FG, pigment content about 35%; from Dainichiseika Color & Chemicals Mfg. Co., Ltd.] and the like can be included.

It is to be noted that, resins that disperse pigments include polyamide resins, polyurethane resins, polyester resins, epoxy resins, melamine resins, phenol resins, silicone resins, polyvinyl alcohols, polyvinyl pyrrolidone, polyvinyl acetate, polyvinyl chloride, polyvinylidene chloride, polystyrene, acrylic acid resins, maleic acid resins, gum arabic, celluloses, dextran, casein, etc; and derivatives thereof, copolymers of said resins, and the like.

As fluorescent pigments, synthetic resin particulate-shaped fluorescent pigments, wherein a solid solution of various fluorescent dyes being dissolved in a resin matrix, can be used.

Apart from the pigments mentioned above, white pigments such as titanium oxide; metal powder pigments such as aluminum; pearl pigments in which the surface of a core material selected from natural mica, synthetic mica, alumina and a glass piece is coated with a metal oxide such as titanium dioxide, cholesteric liquid-crystal luster pigments and the like, may also be used.

One or two or more other coloring agents as described above, can be mixed and used as appropriate, the content thereof in that ink composition is preferably 1 to 35 mass %; and more preferably 2 to 30 mass %.

An ink composition may also contain a conventional general-purpose water-soluble organic solvent, which is compatible with water, the organic solvent include, for example, ethanol, propanol, butanol, glycerin, sorbitol, triethanolamine, diethanolamine, monoethanolamine, ethylene glycol, diethylene glycol, thiodiethylene glycol, hexylene glycol, 1,3-butanediol, neoprene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, propylene glycol monomethyl ether, propylene glycol monoethyl ether, 2-pyrrolidone, N-methyl-2-pyrrolidone and the like. It is to be noted that, one or more water-soluble organic solvents may be used in combination, and the content of the water-soluble organic solvents in an ink composition is preferably 2 to 60 mass %; and more preferably 5 to 35 mass %.

An ink composition may also contain shear-thinning imparting agents.

A preferable shear-thinning imparting agent is a substance soluble or dispersible in water; examples of which can include xanthan gum, welan gum, zetashi gum, diyutan gum, macrohomopsis gum, succinoglycan having constituent monosaccharides being organic-acid modified heteropolysaccharides of glucose and galactose, guar gum, locust bean gum and derivatives thereof; hydroxyethyl celluloses, alginic acid alkyl esters; polymers having an alkyl ester of methacrylic acids as a main component and having a molecular weight of 100,000 to 150,000; glucomannan; carbohydrates having gelling ability extracted from seaweeds such as agars and carrageenins; poly N-vinyl-carboxylic acid amide cross-linked products, benzylidene sorbitol and benzylidene xylitol or derivatives thereof; crosslinkable acrylic acid polymers, Inorganic fine particles, nonionic surfactants having an HLB value of 8 to 12, metal salts and amine salts of dialkylsulfosuccinic acids, and the like. Further, N-alkyl-2-pyrrolidone in conjunction with an anionic surfactant may be used in an ink composition.

The content of a shear-thinning imparting agent in an ink composition is preferably 0.1 to 20 mass %.

Apart from this agent, an ink composition may also optionally comprise inorganic salts such as sodium carbonate, sodium phosphate and sodium acetate; PH adjusting agents such as organic basic compounds (e.g., water-soluble amine compounds); rust inhibitors such as benzotriazole, tolyltriazole, saponin; preservatives or mildewproofing agents such as carbolic acids, sodium salts of 1,2-benzthiazoline 3-one, sodium benzoate, sodium dehydroacetate, potassium sorbate, propyl parahydroxybenzoate, 2,3,5,6-tetrachloro-4-(methylsulfonyl) pyridine; wetting agents such as urea, sorbit, mannitol, sucrose, glucose, reduced starch hydrolyzate, sodium pyrophosphate; antifoaming agents; fluorine-based surfactants for improving permeability of an ink; and nonionic surfactants.

Further, an ink composition may comprise a lubricant, including, for example, a metal soap, a polyalkylene glycol fatty acid ester, an ethylene oxide addition type cationic activator, a phosphate ester type activator, an N-acylamino acid type surfactant, a dicarboxylic acid type surfactant, a β-alanine type surfactant, 5-dimercapto-1,3,4-thiadiazole and salts and oligomers thereof; 3-amino-5-mercapto-1,2,4-triazole, thiocarbamate, dimethyldithiocarbamate; a condensate of N-acyl-L-glutamic acid and L-lysine; and salts thereof.

Furthermore, an ink composition may comprise thickening suppressants such as an oligomer of the N-vinyl-2-pyrrolidone, an oligomer of N-vinyl-2-piperidon, N-vinyl-2-pyrrolidone, N-cyclohexyl-2-pyrrolidone, ε-caprolactam, an oligomer of the N-vinyl-ε-caprolactam, this also makes it possible to enhance the dry up function (a cap off function) in a projecting/retracting form.

An ink composition for a writing instrument may also comprise, within a category that does not hinder drying resistance, one or two or more of water-soluble resins such as alkyd resins, acrylic resins, styrene maleic acid copolymers, cellulose derivatives, polyvinyl pyrrolidone, polyvinyl alcohols, dextrins and the like. Further, it may comprise one or two or more of wetting agents such as ureas, nonionic surfactants, sorbit, mannitol, sucrose, glucose, reduced starch hydrolyzate, sodium pyrophosphate and the like.

(Ball-Point Pen Tips)

As a ball-point pen tip, the following can be applied: a tip holding a ball in a ball holding part, the ball holding part having the vicinity of a front end of a metal pipe being pressed and deformed inward from an outer surface; or a tip holding a ball in a ball holding part, the ball holding part having a metal material being formed by cutting with a drill or the like; or a tip holding a ball, the tip being formed by cutting a metal pipe or a metal material, and the ball being urged forward by the coil spring, for example.

In one embodiment, a ball-point pen tip includes, as a component, a tip main body having a ball holding chamber, and a ball. Also, in one embodiment, at the center of the bottom wall of a ball holding chamber, an ink circulation hole and a plurality of (two to six or so) ink circulation grooves radially extending from the ink circulation hole are formed; on the bottom wall of the ball holding chamber, the ball seat having a generally circular arc surface shape is provided; the ball is placed on the ball seat so that a part thereof protrudes from the front edge of the tip, and can be held rotatably.

As a ball, a general-purpose one consisting of cemented carbide, stainless steel, ruby, ceramic or the like, can also be applied. Moreover, the diameter of a ball (referred to a ball diameter in the present invention) is preferably 0.1 mm to 2.0 mm; and more preferably 0.2 mm to 1.2 mm.

In particular, in the case of a small ball having a diameter of 0.5 mm or less, the number of rotations per the writing distance being high, allowing the effect of the present invention to be more remarkably exhibited; hence for example, the ball diameter is preferably 0.4 mm, 0.38 mm, 0.3 mm.

By forming a generally arcuate sealing surface on the inner wall of the front end portion of the ball-point pen tip; and by assuming the vertical clearance of a ball to be 15 µm to 40 µm; the handwriting is stabled, and thereby allowing wear of the ball seat to be suppressed.

It is thought that by providing a ball seat having a generally circular arc surface shape on the bottom wall of a ball holding chamber, the contact area of the ball and tip main body increases, and thus wear of the seat is suppressed. However, by forming the ball seat, the space (volume) of the ball holding chamber not including the ball space is reduced, normally, the ink consumption tends to decrease, whereas the writing instrument of the present invention has a pressurizing mechanism, thus resulting in a formation of the handwriting having an excellent density without reducing the ink consumption.

In particular, a ball-point pen with a ball having a diameter of 0.5 mm or less placed in the ball seat, the ball seat tends to be grossly worn. By assuming the vertical clearance of a ball to be 15 to 40 µm; and preferably to be 20 to 30 µm, the handwriting is stabled; and thereby allowing ink leakage from the front end of a tip to be suppressed.

(Others)

Further, a writing instrument according to the present invention may have the ink follower (liquid plug) loaded at the rear end of the ink storage cylinder filled with an ink composition.

An ink follower may be liquid or solid.

A liquid ink follower includes nonvolatile media such as polybutene, α-olefin oligomers, silicone oils, refined mineral oils and the like, and if desired, silica, aluminum silicate, swelling mica, fatty acid amide and the like can also be added into the medium. Furthermore, solid ink followers include resin molded products.

It should be noted that, liquid and solid ink followers can also be used in combination.

Also, a writing instrument according to the present invention preferably comprises a friction member. The handwriting formed by the ball-point pen refill may be scratched using a friction member to generate a frictional heat, by which the handwriting can be thermally discolored.

The installation positions of a friction member include, but not limited to, the front end portion, the rear end portion, and the side surface portion of the barrel, the surface of the clip, the operational portion or the like; and they can be provided by adhesion, fusion bonding, fitting, two-color molding, etc, which may be installed in two or more places.

The material constituting the friction member is also preferably a synthetic resin (rubber, elastomer) having elasticity, specifically include silicone resins, SBS resins (styrene-butadiene-styrene copolymers), SEBS resins (styrene-ethylene-butylene-styrene copolymers), fluorine resins, chloroprene resins, nitrile resins, polyester resins, ethylene propylene diene rubbers EPDM) and the like.

Preferably, an elastic synthetic resin comprises a low-abrasive elastic material, which, upon friction, hardly breaks or produces an abrasion residue (an eraser). It is not preferable to use a highly abrasive elastic material or a frictionally disintegrable material (e.g., an eraser or the like).

EXAMPLES

The present invention will now be described in further detail with reference to Examples, the present invention is not limited to thereto.

Example 1-1

A writing instrument 1 according to one embodiment, as shown in FIGS. 1 to 4, comprises a barrel main body configured by screwing the front shaft 2 and the rear shaft 3.

In addition, a ball-point pen refill 11, through a ball-point pen refill holding member 9 which is detachably press-fitted and mounted in a piston 5, is disposed inside the barrel main body.

Further, this writing instrument 1 has an ejector mechanism of the ball-point pen tip 12. Here, the ball-point pen refill 11 is slidably disposed being urged in the direction of the rear end of the rear shaft 3 by the coil spring 16. When the knock body 4 is pressed, a slidably disposed ball-point pen refill 11 is pushed toward the front end, and the ball-point pen tip 12 protrudes from the front end.

A transparent ink storage cylinder consisting of a polypropylene resin (hereinafter referred to as PP resin) provided in the ball-point pen refill 11 comprises an ink composition 11A loaded therein, wherein the ink composition 11A having shear-thinning properties with the following ink formulation.

Further, the ink storage cylinder comprises a grease-like ink follower loaded at its rear end, wherein the ink follower follows the consumption of the ink composition 11A.

Moreover, at the front end opening portion of an ink storage cylinder, the rear end portion of ball-point pen tip 12 provided in the ball-point pen refill 11, rotatably holding a ball (having a diameter of 0.38 mm) is press-fitted. It is to be noted that, behind the ball, the coil spring (not shown) is preferably disposed, wherein the coil spring always presses the ball against the inner wall of the front end of the tip. By providing such a structure, leakage of an ink composition 11A can be suppressed.

Next, an ejector mechanism of the ball-point pen tip 12 (the front end portion of a writing section) provided in the ball-point pen refill 11 will be described.

First, when pressing a knock body 4 in the direction of the front end opening portion 2A of a front shaft 2 (in the direction of the arrow F in FIG. 1), a locking portion 4C formed on the outer wall of a knock body 4 slidably disposed in the sliding hole 3A of a rear shaft 3 is locked to the locked portion 10A at the front end portion of a clip 10; and then the front end portion of the ball-point pen tip 12 of the ball-point pen refill 11 is maintained in a state of protruding from the front end opening portion 2A of the front shaft 2.

In addition, when this ejector mechanism presses the rear end portion of the clip 10 to release the locking portion 4C locked to the locked portion 10A of the clip, an urging force of the coil spring 16 drives the ball-point pen tip 12 to be immersed into the front end opening portion 2A of the front shaft 2.

The rear end portion of the ball-point pen refill 11 is press-fit held by the ball-point pen refill holding member 9 being press-fitted into the piston 5; and the inside and outside of the piston 5 are communicated through an air hole 5A formed in the rear end portion of the piston 5.

Additionally, a cylinder 6 is disposed over the piston 5, and then, the front end face 6 A of the cylinder 6 abuts against the outer wall step portion 5B formed on the outer wall of the piston 5 to work with the cylinder 6; thus allowing the piston 5 to move in the direction of the front end opening portion 2A of the front shaft 2.

Moreover, there is provided a configuration wherein the coil spring 15 is disposed between the piston 5 and a knock body 4, and the knock body 4 can always be urged toward the rear end direction of the rear shaft 3.

A pressurization mechanism which works with the operation of an ejector mechanism will be described in detail below.

By advancing the knock body 4 toward the front end opening portion 2A of the front shaft 2 from the immersed position of the ball-point pen tip 12, an elastic body 8 mounted in the knock body 4 is pressed against the rear end face of the cylinder 6, an air hole 6B is closed to form a sealed space in the cylinder 6.

Further, as the knock body 4 advances toward the front end opening portion 2A of the front shaft 2, the cylinder 6 advances toward the front end opening portion 2A of the front shaft 2.

The ball-point pen refill 11 is press-fit held by the ball-point pen refill holding member 9, the ball-point pen refill holding member 9 is press-fitted in the piston 5, and the outer wall surface of the piston 5 and the inner wall surface 6C of the cylinder 6 are slidably sealed each other by an O-ring 7.

The rear end portion of the ball-point pen refill 11 communicates with the piston 5, and the piston 5 is communicated with inside the cylinder 6 through an air hole 5a, in order that the front end face 6A of the cylinder 6 compresses the space in the cylinder 6 until it abuts against the outer wall step portion 5B of the piston 5. Whereby, since the space inside the piston 5 is also compressed, pressure can be applied via the ink follower to the ink composition 11A from the rear end side of the ink storage cylinder provided in the ball-point pen refill 11. It is to be noted that, the pressure involved was, for example, 1190 hPa.

Further, when the knock body 4 is advanced in the direction of the front end opening portion 2A of the front shaft 2, the piston 5 and the ball-point pen refill 11 are advanced via the cylinder 6, the locking portion 4C, which is formed on the outer wall of the knock body 4, is locked to the locked portion 10A of the front end portion of the clip 10. Thus, a state wherein pressure is applied to the ink composition 11A from the rear end side of the ink storage cylinder, the state wherein the ball-point pen tip 12 of the ball-point pen refill 11 is protruding from the front end opening portion 2A of the front shaft 2 is maintained.

Furthermore, when the engaging portion 4C locked to the locked portion 10A of the clip 10 is released, first of all, the knock body 4, as being subjected to an urging force of the spring 15, moves backward in the direction of the rear end of the rear shaft 3.

At this time, the elastic body 8 pressed against the rear end face of the cylinder 6, together with the knock body 4, is retracted in the direction of the rear end of the rear shaft 3; the air hole 6B of the cylinder 6 is opened; the sealed state in the cylinder 6; in addition, the piston 5 and the rear end portion of the ball-point pen refill 11 is released; thereby becoming equal to the atmospheric pressure.

Further, the urging force of the coil spring 14 allows the piston and the ball-point pen refill 11 and the cylinder 6 to be retracted in the direction of the rear end of the rear shaft 3; thus the ball-point pen tip 12 of the ball-point pen refill 11 is immersed from the front end opening portion 2A of the front shaft 2.

Also, a writing instrument according to the present embodiment comprises the front end portion of a front shaft 2 having a friction member 18 consisting of a styrene elastomer provided integrally with a barrel by two color molding. The handwriting formed by the ball-point pen refill 11 may be scratched using a friction member 18 to generate a frictional heat, by which the handwriting can be thermally discolored (decolorized).

The formulation of an ink composition 11A used in this embodiment (ink formulation 1) will be described below.

The microcapsule pigment 17 mass % (those previously cooled to −23° C. or lower and developed in black) of a reversible thermochromism (color memory type) was uniformly dispersed in an aqueous ink vehicle comprising a xanthan gum (shear-thinning imparting agents) 0.33 mass %, urea 10.0 mass %, glycerin 10 mass %, phosphoric acid ester surfactant 0.6 mass %, modified silicone antifoaming agent 0.1 mass %, antifungal agent 0.2 mass %, water 61.77 mass %; and an ink composition 11A containing a reversible thermochromic ink was prepared.

The handwriting, which was formed on paper using the ink composition 11A of this embodiment, exhibits a black color at room temperature (25° C.); and when rubbed using a friction body, it decolored and then became colorless. It should be noted that, this state could be maintained at room temperature.

Also, the paper surface having a handwriting decolored was cooled to a temperature of −23° C. or lower in the freezer; which resulted in a discoloration behavior where the handwriting color developed again (turned black).

Said behavior caused by heating and cooling could be repeatedly reproduced.

The ink consumption value per unit area and the handwriting density of before and after pressurization of the ball-point pen refill are shown in Table 1. As a reference example, the ink consumption value per unit area and the handwriting density of commercially available knock-type gel ink ball-point pen (Trade designation: G-knock) from Pilot Corporation are also shown in Table 1.

Example 1-2

The same writing instrument as in Example 1-1 was prepared except that the formulation of an ink composition 11A was changed as follows to name it "Ink formulation 2". Then the ink consumption value per unit area before and after pressurization of the ball-point pen refill etc., were measured and showed in Table 1. The microcapsule pigment 17 mass % (those previously cooled to −23° C. or lower and developed in black) of a reversible thermochromism (color memory type) was uniformly dispersed in an aqueous ink vehicle comprising a xanthan gum (shear-thinning imparting agents) 0.5 mass %, urea 10.0 mass %, glycerin 10 mass %, phosphoric acid ester surfactant 0.6 mass %, modified silicone antifoaming agent 0.1 mass %, antifungal agent 0.2 mass %, water 61.6 mass %; and an ink composition 11A containing a reversible thermochromic ink was prepared.

The handwriting, which was formed on paper using the ink composition 11A of this embodiment, exhibits a black color at room temperature (25° C.); and when rubbed using a friction body, it decolored and then became colorless. It should be noted that, this state could be maintained at room temperature.

Moreover, the paper surface having a handwriting decolored was cooled to a temperature of −23° C. or lower in the freezer; which resulted in a discoloration behavior where the handwriting color developed again (turned black). Said behavior caused by heating and cooling could be repeatedly reproduced.

The microcapsule pigment 17 mass % (those previously cooled to −23° C. or lower and developed in black) of a reversible thermochromism (color memory type) was uniformly dispersed in an aqueous ink vehicle comprising a xanthan gum (shear-thinning imparting agents) 0.66 mass %, urea 10.0 mass %, glycerin 10 mass %, nonionic surfactant 0.6 mass %, modified silicone antifoaming agent 0.1 mass %, antifungal agent 0.2 mass %, water 61.44 mass %; and an ink composition 11A containing a reversible thermochromic ink was prepared.

The handwriting, which was formed on paper using each of the ink compositions 11A described above, exhibits a black color at room temperature (25° C.); and when rubbed using a friction body, it decolored and then became colorless. It should be noted that, this state could be maintained at room temperature.

Also, the paper surface having a handwriting decolored was cooled to a temperature of −23° C. or lower in the freezer; which resulted in a discoloration behavior where the handwriting color developed again (turned black).

Said behavior caused by heating and cooling could be repeatedly reproduced.

TABLE 1

| | Example 1-1 Ink formulation 1 | | Example 1-2 Ink formulation 2 | | Example 1-3 Ink formulation 3 | | Reference Example Knocktype gel ink ball-point |
|---|---|---|---|---|---|---|---|
| | Refill 1 Before pressurization | Refill 1 After pressurization | Refill 1 Before pressurization | Refill 1 After pressurization | Refill 1 Before pressurization | Refill 1 After pressurization | pen (G-Knock 0.38) |
| Pressure force (hPa) | Atmospheric pressure (1000 hPa) | 1190 hPa | Atmospheric pressure (1000 hPa) | 1190 hPa | Atmospheric pressure (1000 hPa) | 1190 hPa | Atmospheric pressure (1000 hPa) |
| Ball diameter (mm) | 0.38 | | 0.38 | | 0.38 | | 0.38 |
| ink consumption (mg/10 m) | 7.3 | 40.0 | 6.3 | 34.2 | 4.9 | 28.3 | 38 |
| Line width(mm) | 0.166 | 0.333 | 0.158 | 0.31 | 0.148 | 0.276 | 0.242 |
| Ink consumption value (mg/cm$^2$) | 0.441 | 1.203 | 0.400 | 1.103 | 0.334 | 1.027 | 0.68 |
| Handwriting density | 0.325 | 0.986 | 0.284 | 0.867 | 0.258 | 0.813 | 1.171 |
| Tip clearance (μm) | 21 | | 21 | | 21 | | 21 |
| Ink viscosity (mPa · S) 3.84 sec$^{-1}$ | 602 | | 1114 | | 1728 | | 420 |
| Ink viscosity (mPa · S) 384 sec$^{-1}$ | 27 | | 37 | | 50 | | 30 | handwriting color developed again (turned black). Said behavior caused by heating and cooling could be repeatedly reproduced.

Example 1-3

The same writing instrument as in Example 1-1 was prepared except that the formulation of an ink composition 11A was changed as follows to name it "Ink formulation 3", the ink consumption value per unit area before and after pressurization of the ball-point pen refill and the like, were measured and showed in Table 1.

It is to be noted that, the ink consumption per 10 m is measured in conformity with JIS standard S6054 (20° C., writing angle 70 degrees writing speed 4 m/min, self-revolution, writing load 100 gf, underlay stainless steel plate); and after 10-m writing, the ink remaining amount was measured and found by calculation. Also, it is determined by the average value by successively conducting such tests five times, i.e., five in total (a total of 50 m).

Additionally, for the handwriting width and the handwriting density, the handwriting obtained by said writing is measured in conformity with ISO 13660, the handwriting width (mm) is an area of 60% or less of reflectance, the handwriting density is an average value within the range of reflectance of 75% or less. The handwriting width and the handwriting density in the claimed invention can be determined by a personal image quality evaluation device (from QEA (Quality Engineering Associates), PIAS-II). It is to be noted that, in the present invention, 15 points were measured, and the average value thereof was determined.

Using Brookfield DV-II viscometer (Cone rotor CPE42), under an environment of 20° C., as well as under the conditions at a shear rate of 3.84 sec$^{-1}$ (10 rpm) and at a shear rate of 384 sec$^{-1}$ (100 rpm), the ink viscosity can be measured.

Example 2

Figure 5:
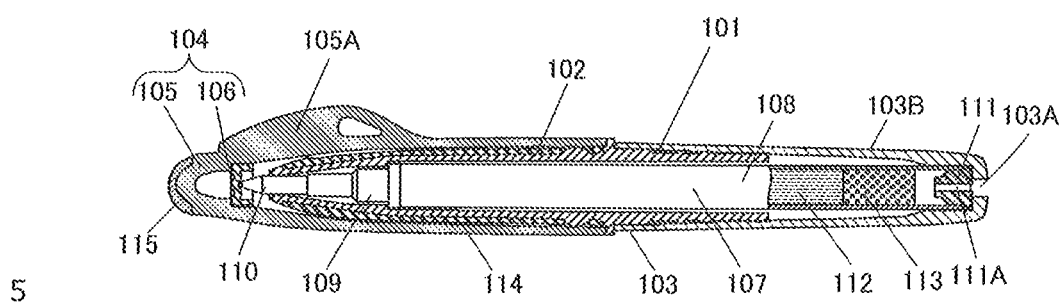
FIG. 5 is a longitudinal-sectional view showing the writing instrument of Example 2.
Figure 6:
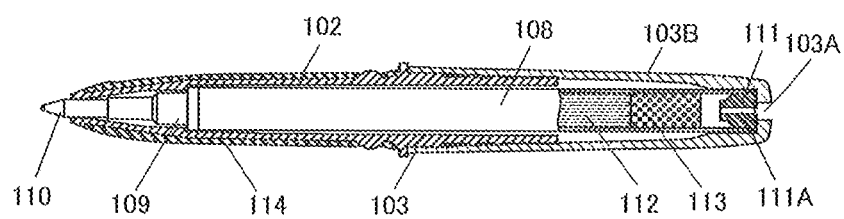
FIG. 6 is a longitudinal-sectional view showing the writing instrument of FIG. 5, with a cap removed.
Figure 7:
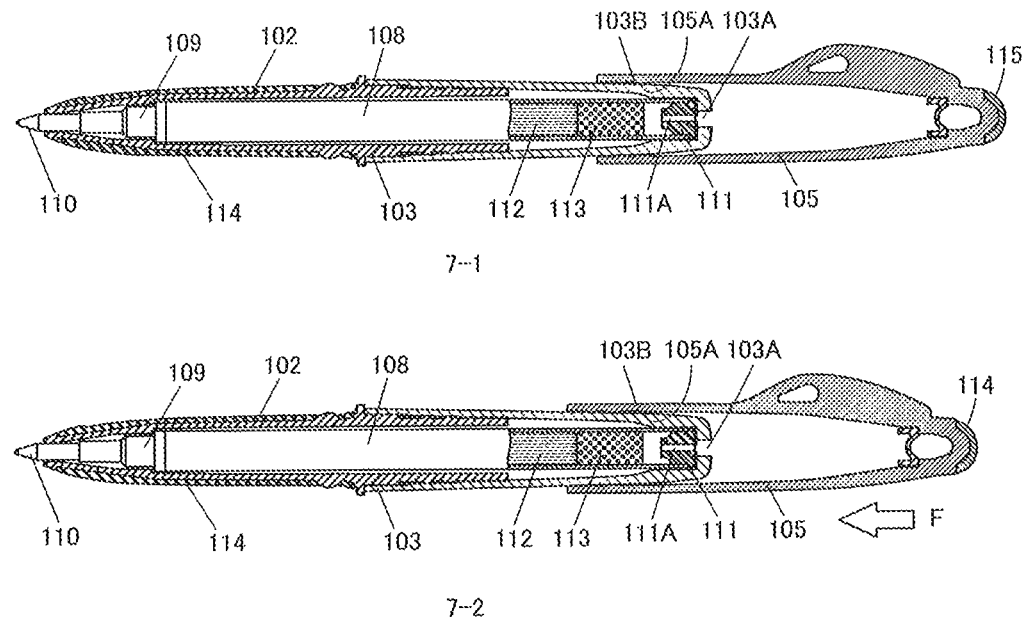
FIG. 7 is an explanatory drawing showing the writing instrument, in a state wherein the cap thereof is fitted to the rear end portion of a barrel (being in a pressurized state).
Figure 8:
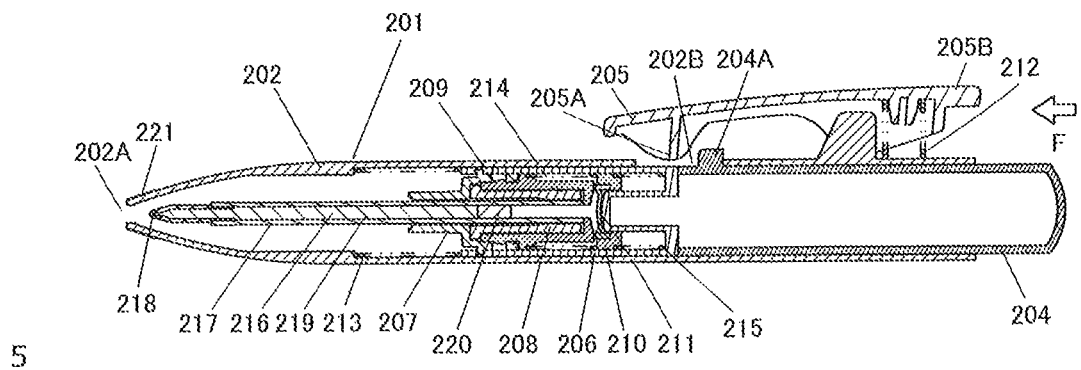
FIG. 8 is a longitudinal-sectional view showing the writing instrument of Example 3.
Figure 9:
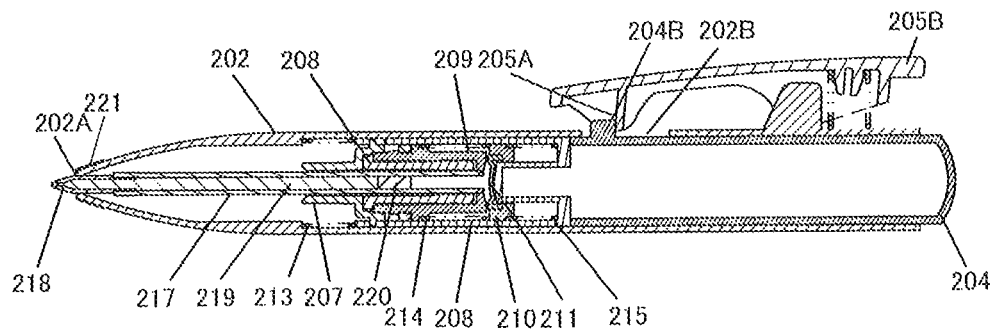
FIG. 9 is a longitudinal-sectional view showing the writing instrument of FIG. 8, in a state wherein a ball-point pen tip being protruded.
Figure 10:
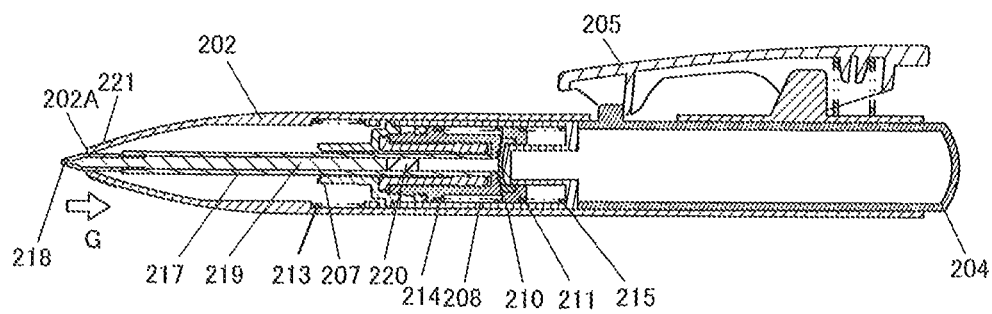
FIG. 10 is an illustration showing the writing instrument of FIG. 8, in a state wherein a writing pressure is applied (being in a pressurized state).
Figure 11:
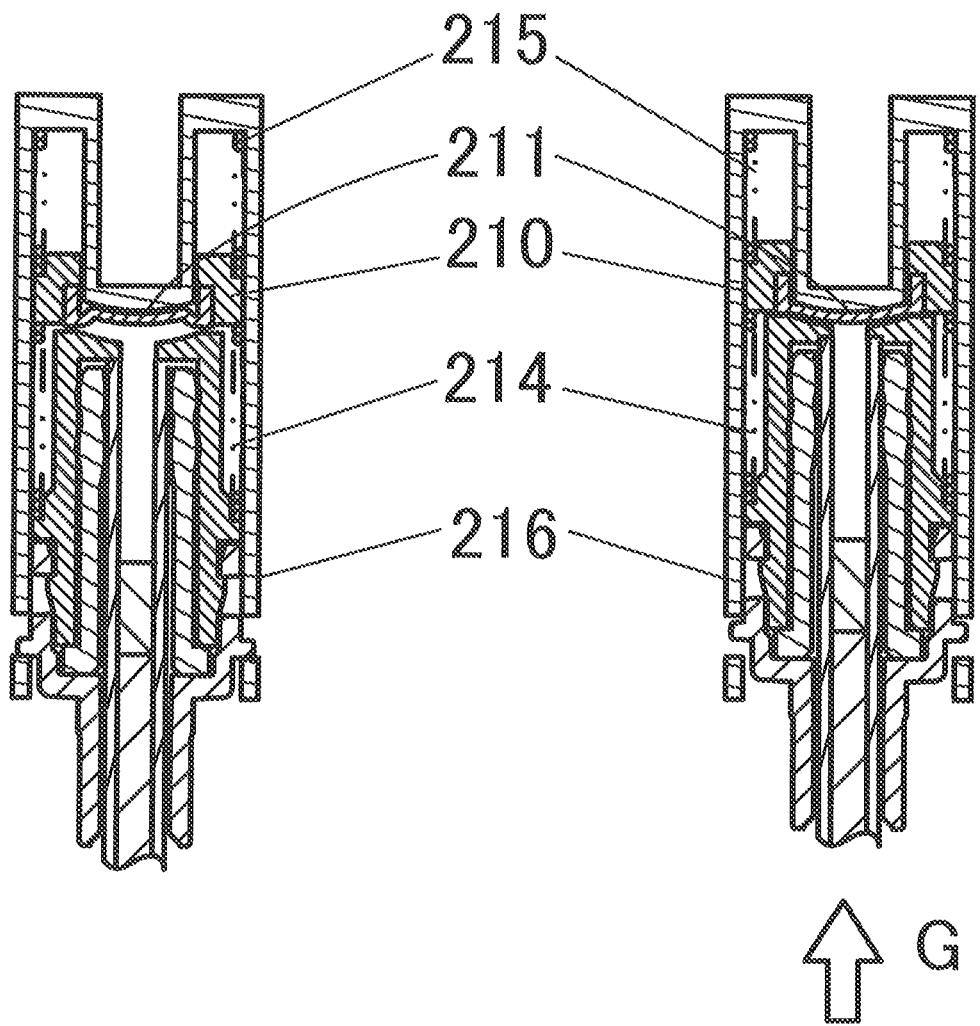
FIG. 11 is a main section illustration for the pressurization mechanism of a writing instrument in FIG. 9.

The writing instrument 101 of the second embodiment shown in FIGS. 5 to 7 comprises the ball-point pen refill 107 disposed inside a barrel main body which is coupled to a front shaft 102 having a grip member 114 mounted on a grip portion; and a rear shaft 103. Moreover, a writing instrument according to the present invention comprises a translucent cap 104 obtained by the injection molding of a PP resin, detachably mounted on a fitting convex part formed on the side wall of a front shaft 102, by fitting over the fitting protruded part formed on the inner wall of a cap 104.

At the front end of the ink storage cylinder 108 provided in the ball-point pen refill 107, the ball-point pen tip 110 rotatably holding a ball having a diameter of 0.38 mm is mounted by a tip holder 109. Furthermore, a tail plug 111 having an air hole, which is in communication with the inside and outside, is mounted at the rear end portion of an ink storage cylinder 108.

An ink storage cylinder 108 comprises an ink composition 112 containing a reversible thermochromic ink consisting of the ink formulation 1 described above; and an ink follower 113, which are loaded inside the ink storage cylinder 108.

It is to be noted that, although not shown, behind the ball, the coil spring is disposed in order to always press the ball against the inner wall of the front end of the tip.

Also, the rear end portion of an ink storage cylinder 108 provided in the ball-point pen refill 107 is press-fit mounted within the rear end portion of a rear shaft 103; a space following the portion having the ink composition 112 and the ink follower 113 loaded into the ink storage cylinder 108, only communicate with outside air through a communication hole 103A, which is provided at the rear end portion of the rear shaft 103 that is in communication with inside and outside the writing instrument.

A pressurizing mechanism operated by fitting the cap 104 will be described in detail below.

Mating a cap 104 with the rear shaft 103 of the main body of a writing instrument, enables pressure to be applied via the ink follower 113 onto the ink composition 112 loaded into the ball-point pen refill 107.

Specifically, when the rear end portion of the rear shaft 103 is inserted in the direction of the arrow F in the figure on the opening end side of a cap main body 105, first of all, the inner wall 105A of the cap main body 105 abuts against the side wall 103B of the rear shaft 103.

At this time, through a communication hole 103A communicating between the inside and the outside, provided at the rear end portion of a rear shaft 103, the inside of the cap main body 105, the inside of the rear shaft 103, and the space of the ink storage cylinder 108, are communicated in a sealed state.

Further, allowing a cap 104 to be advanced in the direction of the arrow F in the figure, the above-mentioned enclosed space is compressed until the fitting is completed. As a result, pressure can be applied via the ink follower 113 to the ink composition for a writing instrument loaded into the ball-point pen refill 107. It is to be noted that, the pressure involved was 1050 hPa.

Additionally, a writing instrument according to the present embodiment comprises cap main body 105, having a friction member 115 consisting of a styrene elastomer mounted on the top of the cap main body 105. By a frictional heat generated by scratching the handwriting formed by the ball-point pen refill 107, the handwriting can be thermally discolored (decolorized).

Moreover, a fitting method of a cap and a front or a rear shaft, as long as it is detachably mounted, include but not limited to, screw fitting, recessed/protruded fitting, getting-over fitting and the like, in the case of recessed/protruded and getting-over fittings, there is a fear that the airtightness may be reduced at the time of fitting, the fitting method of the cap 4 with the rear shaft is preferably press-fitting.

Due to the configuration described above, when the cap is fitted to the rear end portion of the barrel, pressure is applied to the rear end of the ink composition; whereas when the cap is removed, the rear end of the ink composition communicates with the outside air, thus becoming equal to the atmospheric pressure.

Consequently, in a state in which the cap is not fitted to the rear end portion of the barrel cylinder or the cap is detached from the rear end portion of the barrel, the writing instrument can be used as that of a non-pressurized type (wherein pressure is not applied to the rear end of the ink composition).

Example 3

In the writing instrument 201 shown in FIGS. 8 to 11, the ball-point pen refill 216, which is detachably press-fitted and mounted in the piston 209 through a holder 207 and the ball-point pen refill holding member 208, is disposed in the barrel 202.

In addition, this writing instrument 201 has an ejector mechanism of the ball-point pen tip 218, wherein the holder 207, the piston 209, the refill holding member 208 and the ball-point pen refill 216 are slidably disposed being urged by a receiving member 206 through the coil spring 213 in the direction toward the rear end of the barrel 2.

The front end portion of a barrel 2 has a friction member 221 consisting of a styrene elastomer provided integrally with the barrel 202 by two color molding. The handwriting formed by the ball-point pen refill 216 can be thermally discolored (decolorized) by the frictional heat, which was generated by scratching the handwriting using this friction member 221.

A transparent ink storage cylinder 217 consisting of PP resin provided in a ball-point pen refill 216 comprises an ink composition 219 loaded therein, wherein the ink composition 219 is imparted with shear-thinning properties consisting of the ink formulation 1 described above; further, the rear end of the ink storage cylinder comprises a grease-like ink follower 220 loaded therein, wherein the ink follower 220 follows the consumption of an ink.

Additionally, at the front end opening portion of an ink storage cylinder 217, the rear end portion of a ball-point pen tip 218 rotatably holding a ball (having a diameter of 0.38 mm), is press-fitted.

Next, an ejector mechanism of a ball-point pen tip 218 provided in a ball-point pen refill 216 will be described.

First, when pressing a knock body 204 in the direction of the front end opening portion 202A of a barrel 202 (in the direction of the arrow F in FIG. 1), a locking portion 204A formed on the outer wall of a knock body 204 slidably disposed in the sliding hole 2028 of a barrel 202 is locked to the locked portion 205A at the front end portion of a clip 205; so that the front end portion of a ball-point pen tip 218 provided in a ball-point pen refill 216 is maintained in a state of protruding from the front end opening portion 202A of the barrier 202.

Additionally, when this ejector mechanism presses the rear end portion 205B of the clip 205 to release the locking portion 204A locked to the locked portion 205A of the clip 205, an urging force of the coil spring 213 drives the ball-point pen tip 218 to be immersed into the front end opening portion 202A of the front shaft 2.

The rear end portion of the ball-point pen refill 216 is press-fit held by the ball-point pen refill holding member 208 being press-fitted into the piston 209; and the inside and outside of the piston 209 are communicated through an air hole formed in the rear end portion of the piston 209.

Additionally, the receiving member 206 is disposed over the piston 209; further, a second coil spring 214 is disposed between the receiving member 206 and a sealing member holding member 210 provided behind the piston 209; and a third coil spring 215 is disposed between the sealing member the holding member 210 and the receiving member 206.

A pressurization mechanism included in a writing instrument according to the present embodiment will be described in detail below.

Upon writing using the writing instrument according to the present embodiment having the front end portion of a ball-point pen tip 218 protruding from the front end of the barrel 202, its writing pressure will move a ball-point pen refill 216 in the direction of the arrow G, against the urging force of the second coil spring 214 and the third coil spring 215. Whereby, the ball-point pen refill 216, the refill holding member 208 and the piston 209 work with one another to move backwards, and the second coil spring 214 is compressed, the sealing member 211 disposed on the receiving member 206 is brought into pressure contact to form an enclosed space.

Further, when the piston 209 is moved in the direction of the arrow G, the third coil spring 215 is compressed, the sealing member 211 is deformed, and the above-mentioned enclosed space is compressed. Hence, pressure can be applied via the ink follower 20 to the ink composition 219 loaded in the ball-point pen refill 216.

It is to be noted that, the load required to compress the second coil spring 214 is set lower than that required to compress the third coil spring 215.

Moreover, when the writing pressure is released (when there is no writing), that is, when the writing is stopped, first, the third coil spring 215 returns to its original state, and then the second coil spring 214 returns to its original state, the ball-point pen refill 216 moves toward (returns to) the direction of the front end of the barrel 202 (the direction opposite to the direction of the arrow G). Specifically, the sealing member 211, which is pressed and deformed by the rear end face of the piston 209, is restored to its original shape, so that the air hole of the piston 209 is opened; the sealed state of the space following the portion filled with the ink composition 219 and the ink follower 220 in the piston 206 and in the ink storage cylinder 217 is released; thus becoming equal to the atmospheric pressure.

It is to be noted that, the pressure applied via the ink follower 220 to the ink composition 219 was 1020 hPa.

It is to be noted that, the present invention preferably has a configuration in which at least one ball-point pen refill is movably contained in the front-back direction in the barrel; such configurations include, for example, a configuration in which one ball-point pen refill is movably contained in the front-back direction in the barrel, or a plurality of ball-point pen refills are movably contained in the front-back direction in the barrel.

Examples 1 and 3 exemplify, for convenience' sake, mechanisms that cause the front end portion of the tip to eject from the front end opening portion of the barrel through rear-end knocking and clip manipulations. Such mechanisms include, but not limited to knocking, sliding, rotary, or any other particular type.

INDUSTRIAL APPLICABILITY

A writing instrument according to the present invention is also widely available as a writing instrument having different ink colors, or a writing instrument having different mechanisms such as simplex or duplex. In particular, it can be suitably used when a black thermochromic ink composition is used in combination.

REFERENCE SIGNS LIST

1 Writing Instrument
2 Front shaft
2A Front end opening portion
3 Rear shaft
3A Sliding hole
4 Knock body
4A Locked portion
4C Locking portion
Piston
5A Air hole
5B Outer wall step portion
6 Cylinder
6A Cylinder front end face
6B Air hole
6C Cylinder inner wall surface
7 O-ring
8 Sealing member
9 Ball-point pen refill holding member
Clip
10A Locked portion
11 Ball-point pen refill
11A Ink composition
12 Ball-point pen tip
13, 14 Coil spring receiving member
15, 16, 17 Coil spring
18 Friction member
101 Writing instrument
102 Front shaft
103 Rear shaft
103A Communication hole
103B Rear shaft side wall
104 Cap
105 Cap main body
105A Cap main body inner wall
107 Ball-point pen refill
108 Ink storage cylinder
109 Tip holder
110 Ball-point pen tip
111 Tail plug
112 Ink composition for a writing instrument
113 Ink follower 114 Grip member
115 Friction member
201 Writing instrument
202 Barrel
202A Opening portion
202B Sliding hole
204 Knock body
204A Locking portion
205 Clip
205A Locked portion
205B Clip rear end portion
206 Receiving member
207 Holder
208 Refill holding member
209 Piston
211 Sealing member
213 Coil spring
214 Second coil spring
215 Third coil spring
216 Ball-point pen refill
217 Ink storage cylinder
218 Ball-point pen tip
219 Ink composition for a writing instrument
220 Ink follower
221 Friction member

The invention claimed is:

1. A writing instrument comprising:
an ink storage cylinder having an ink composition loaded therein, the ink composition comprising a reversible thermochromic microcapsule pigment;
a ball-point pen refill including a ball-point pen tip attached to a front end portion of the ink storage cylinder; and
a pressurization mechanism that applies pressure from a rear end side of the ink storage cylinder to the ink composition.

2. The writing instrument according to claim 1, wherein handwriting density of a handwriting formed during pressurization by the pressurization mechanism is 0.7 to 1.5.

3. The writing instrument according to claim 1, wherein ink consumption per 10 m achieved during pressurization by the pressurization mechanism is 1.3 times or more as compared with that during non-pressurization.

4. The writing instrument according to any one of claim 1, wherein ink viscosity of the ink composition for a writing instrument is 600 mPa·s to 2000 mPa·s, at 20° C. and at a shear rate of 3.84 sec$^{-1}$; and 10 mPa·s to 100 mPa·s at a shear rate of 384 sec$^{-1}$.

5. The writing instrument according to any one of claim 1, wherein the pressure applied to the ink composition for a writing instrument is 1 to 1.5 times atmospheric pressure.

6. The writing instrument according to claim 1, wherein handwriting density, when the pressurization mechanism is in operation, is 1.2 times or more as compared with that when the pressurization mechanism is not in operation.

7. The writing instrument according to any one of claim 1, wherein the ink consumption value per unit area is 0.7 to 1.5 mg/cm$^2$.

8. The writing instrument according to claim 1, wherein the ball-point pen tip comprises a tip main body having a ball holding chamber therein, and a ball having a diameter of 0.1 mm to 0.5 mm;
wherein an ink circulation hole is formed at a center of a bottom wall of the ball holding chamber, and a plurality of ink circulation grooves radially extend from the ink circulation hole;
wherein, on the bottom wall of the ball holding chamber, a ball seat having a generally circular arc surface shape is provided; and
wherein the ball is placed on the ball seat, so that a part of the ball can protrude from a tip front end edge to rotatably be held.

9. The writing instrument according to claim 1, further comprising a barrel.

10. The writing instrument according to claim 1, wherein the ball-point pen refill is movably disposed on a back side of the barrel, and urged toward a front end side of the barrel by a resilient member disposed within the barrel,
wherein the pressurization mechanism, by moving the ball-point pen refill backwards, with a front end portion of the ball-point pen tip protruding from a front end of the barrel, presses a rear end portion of the ink storage cylinder against a sealing portion provided inside the barrel to form an enclosed space and compress the enclosed space to apply pressure to the ink composition.

* * * * *